United States Patent
Feng et al.

(10) Patent No.: US 8,252,133 B2
(45) Date of Patent: Aug. 28, 2012

(54) PU COMPOSITE AND METHOD OF FABRICATING THE SAME

(75) Inventors: Chung-Chih Feng, Kaohsiung (TW); I-Peng Yao, Kaohsiung (TW); Ko-Feng Wang, Kaohsiung (TW); Chen-Tai Cheng, Kaohsiung (TW); Kai-Feng Kang, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 0 days.

(21) Appl. No.: 13/071,577

(22) Filed: Mar. 25, 2011

(65) Prior Publication Data

US 2011/0168323 A1 Jul. 14, 2011

Related U.S. Application Data

(62) Division of application No. 12/013,512, filed on Jan. 14, 2008, now abandoned.

(30) Foreign Application Priority Data

Aug. 7, 2007 (TW) .............................. 96129065 A

(51) Int. Cl.
*B32B 37/02* (2006.01)
(52) U.S. Cl. .......... 156/182; 156/61; 156/242; 156/247; 156/249
(58) Field of Classification Search .................. 156/61, 156/182, 242, 246, 247, 249, 307.5, 331.7
See application file for complete search history.

(56) References Cited

U.S. PATENT DOCUMENTS

| | | | |
|---|---|---|---|
| 4,017,656 A * | 4/1977 | Lasman et al. | 427/331 |
| 4,906,516 A | 3/1990 | Okamura et al. | |
| 6,723,820 B1 | 4/2004 | Arcurio et al. | |
| 6,863,953 B2 | 3/2005 | Mori et al. | |
| 6,926,856 B2 | 8/2005 | Hus et al. | |
| 2004/0018337 A1 | 1/2004 | Hus et al. | |
| 2006/0046597 A1 * | 3/2006 | Wang et al. | 442/394 |
| 2006/0272770 A1 * | 12/2006 | Lee et al. | 156/322 |
| 2007/0111620 A1 | 5/2007 | Ono et al. | |

FOREIGN PATENT DOCUMENTS

| CN | 1894463 A | 1/2007 |
|---|---|---|
| TW | 200706361 | 2/2007 |

* cited by examiner

*Primary Examiner* — Khanh P Nguyen
*Assistant Examiner* — John Blades
(74) *Attorney, Agent, or Firm* — Volentine & Whitt, PLLC

(57) ABSTRACT

A PU composite and a method of fabricating the same are provided. The fabrication method includes: (a) providing a release paper; (b) coating a fabric layer on the release paper, the fabric layer containing a PU resin, an abrasion resistant, and a colorant; (c) drying the fabric layer; (d) coating a first laminated layer on the fabric layer; (e) drying the first laminated layer; (f) laminating a wet PU foam layer on the first laminated layer; (g) releasing the release paper to form a semi-product; (h) providing a plastic layer, which is of a thermoplastic; (i) coating a second laminated layer on the plastic layer; (j) drying the second laminated layer; and (k) laminating the semi-product of Step (g) on the second laminated layer, so as to form a PU composite. Compared with conventional PU composites, the PU composite of the present invention has better UV resistance, solvent resistance, and abrasion resistance.

7 Claims, 3 Drawing Sheets

PU COMPOSITE AND METHOD OF FABRICATING THE SAME

CROSS-REFERENCE TO RELATED APPLICATIONS

This is a divisional of application Ser. No. 12/013,512, filed Jan. 14, 2008, which is incorporated herein by reference in its entirety.

BACKGROUND OF THE INVENTION

1. Field of the Invention

The present invention relates to a PU composite and a method of fabricating the same. More particularly, the present invention relates to a PU composite comprising an abrasion resistant and a colorant and a method of fabricating the same.

2. Description of the Related Art

Referring to FIG. 1, a schematic cross-sectional view of a conventional PU composite disclosed in ROC (TW) Patent application No. 095139709 (TW Publication No. TW200706361) is shown. A conventional PU composite 1 includes a plastic layer 11, a second laminated layer 12, a wet PU foam layer 13, a first laminated layer 14, and a fabric layer 15. The material of the plastic layer 11 is thermoplastic. The second laminated layer 12 is located on the plastic layer 11. The wet PU foam layer 13 is located on the second laminated layer 12. The first laminated layer 14 is located on the wet PU foam layer 13. The fabric layer 15 is located on the first laminated layer 14, and the material of the fabric layer 15 is a PU resin that has a texture on the surface thereof.

In application, the conventional PU composite 1 is attached to a substrate, which is generally a housing of an electronic device (for example, notebook computer, PDA, mobile phone, or LCD). After injection molding and then heat pressing, the PU composite 1 is attached to the housing by the plastic layer 11. In such a manner, the texture of the fabric layer 15 and the entire artificial leather of the conventional PU composite 1 can improve the quality of the feeling of the electronic device.

The conventional PU composite 1 is fabricated by a common PU leather manufacturing method, and thus, the test results of the properties thereof are as follows: 1. the solvent resistance test (tested according to AATCC GREY method) is at Grade 2; 2. the surface abrasion test (tested according to ASTM D3884 CS-10 1 Kg method) is 300 times; 3. the UV resistance test (tested according to ASTM G53 method, at the conditions: UVA wavelength of 340 nm, at 60×4 hr→50×4 hr→repeat for 96 hr) is at Grade 2. Therefore, it can be known that the conventional PU composite 1 has the disadvantages of poor UV resistance, poor solvent resistance, and poor abrasion resistance, thus reducing the practicality significantly.

Therefore, it is necessary to provide a PU composite and a method of fabricating the same to solve the above problems.

SUMMARY OF THE INVENTION

The present invention provides a method of fabricating a PU composite, which includes: (a) providing a release paper; (b) coating a fabric layer on the release paper, the fabric layer comprising a PU resin, an abrasion resistant, and a colorant; (c) drying the fabric layer; (d) coating a first laminated layer on the fabric layer; (e) drying the first laminated layer; (f) laminating a wet PU foam layer on the first laminated layer; (g) releasing the release paper, so as to form a semi-product; (h) providing a plastic layer, which is made of a thermoplastic; (i) coating a second laminated layer on the plastic layer; (j) drying the second laminated layer; and (k) laminating the semi-product of Step (g) on the second laminated layer, so as to form a PU composite. Compared with the conventional PU composite, the PU composite of the present invention has better UV resistance, solvent resistance, and abrasion resistance.

The present invention further provides a PU composite, which includes a plastic layer, a second laminated layer, a wet PU foam layer, a first laminated layer, and a fabric layer. The material of the plastic layer is thermoplastic. The second laminated layer is located on the plastic layer. The wet PU foam layer is located on the second laminated layer. The first laminated layer is located on the wet PU foam layer. The fabric layer is located on the first laminated layer and comprises a PU resin, an abrasion resistant, and a colorant.

DETAILED DESCRIPTION OF THE INVENTION

As used in this specification, the term "PU composite" refers to a composite composed of a plurality of layers, in which a layer comprises polyurethane (PU) resin.

FIGS. 2-6 show the schematic cross-sectional views of a method of fabricating the PU composite according to the present invention. Firstly, referring to FIG. 2, a release paper 20 is provided, which has a surface 201. The surface 201 preferably has a texture. Next, a fabric layer 25 is coated on the release paper 20. The fabric layer 25 has a surface 251, which contacts the surface 201 of the release paper 20. The formulation of the fabric layer 25 comprises PU resin, abrasion resistant, and colorant. The fabric layer 25 preferably comprises at least 5-50 wt % of PU resin, 0.05-5 wt % of abrasion resistant, 0.05-15 wt % of colorant, 50-75 wt % of methyl-ethyl ketone (MEK), 5-15 wt % of dimethylformamide (DMF), and 1-10 wt % of toluene (TOL). The abrasion resistant preferably comprises silicone to improve the abrasion resistance of the PU composite. The colorant improves the UV resistance and the solvent resistance of the PU composite, and preferably, the particle size of the colorant is less than 10 µm, preferably less than 5 µm.

Figure 1:
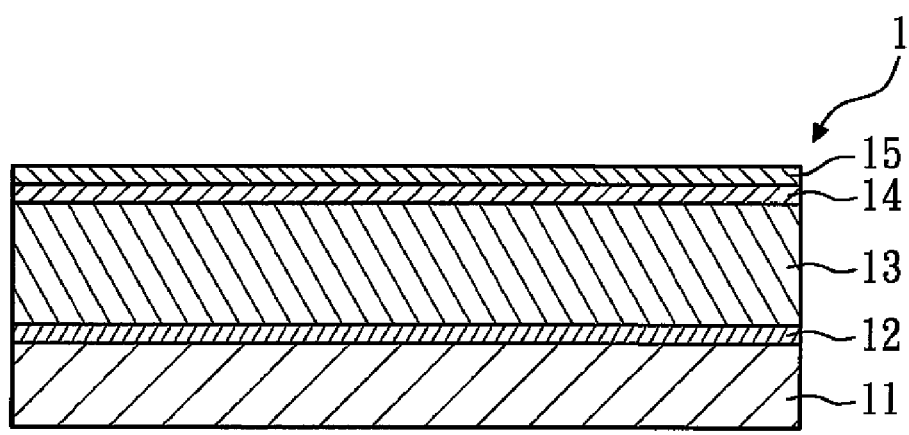
FIG. 1 is a schematic cross-sectional view of a conventional PU composite.
Figure 2:
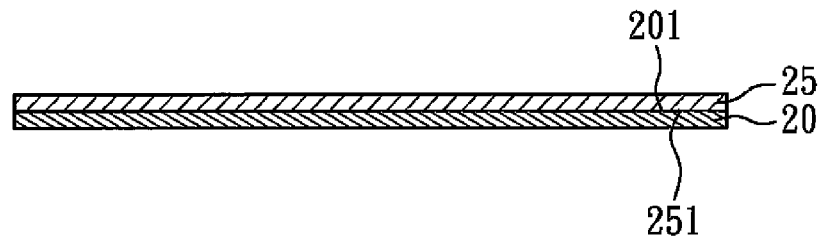
FIGS. 2-6 are schematic cross-sectional views of a method of fabricating the PU composite according to the present invention.
Figure 3:
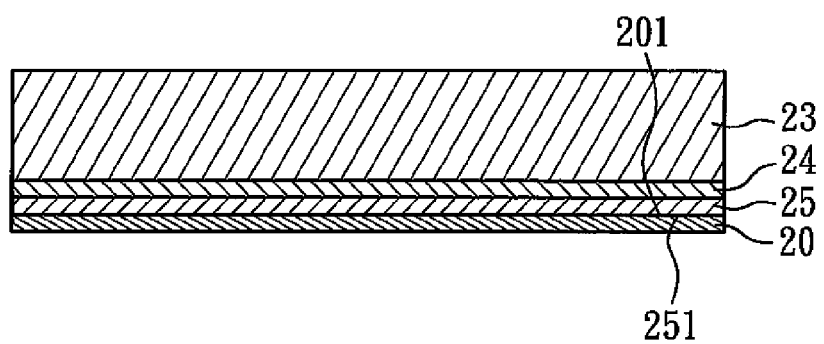

Next, referring to FIG. 3, after drying the fabric layer 25, a first laminated layer 24 is coated on the fabric layer 25. The first laminated layer 24 is a paste, and the material thereof can be pressure-sensitive adhesive, moisture-curable resin, one-component resin, or two-component resin, and so on. Next, after drying the first laminated layer 24, a wet PU foam layer 23 is laminated on the first laminated layer 24. The release paper 20, the fabric layer 25, the first laminated layer 24, and the wet PU foam layer 23 are then preferably placed for ripening and shaping.

Figure 4:
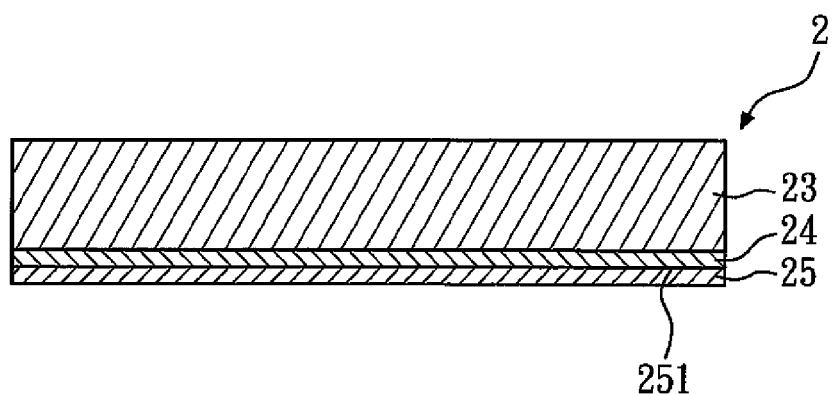

Next, referring to FIG. 4, the release paper 20 is released, so as to form a semi-product 2. After releasing, the surface 251 of the fabric layer 25 has a texture corresponding to the texture of the surface 201 of the release paper 20. The semi-product 2 is preferably further subjected to a surface treatment.

Figure 5:
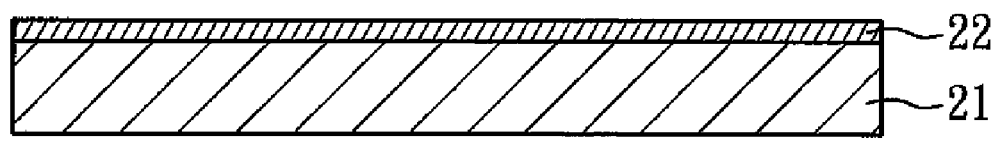

Next, referring to FIG. 5, a plastic layer 21 is provided. The material of the plastic layer 21 is thermoplastic, which is selected from the group consisting of polycarbonate (PC), acrylonitrile-butadiene-styrene copolymer (ABS), polyurethane (PU), acrylic, and mixtures thereof. Then, a second laminated layer 22 is coated on the plastic layer 21. The second laminated layer 22 is a paste, and the material thereof can be pressure-sensitive adhesive, moisture-curable resin, one-component resin, or two-component resin, and so on. Next, the second laminated layer 22 is dried.

Figure 6:
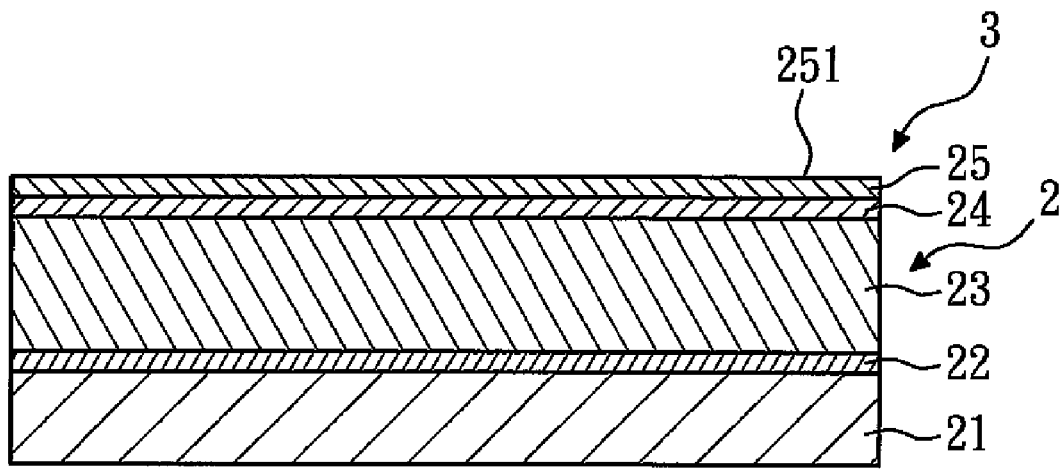

Finally, referring to FIG. 6, the semi-product 2 is laminated on the second laminated layer 22, and thus, the wet PU foam layer 23 of the semi-product 2 is laminated on the second laminated layer 22, so as to form a PU composite 3. The PU composite 3 is preferably placed for ripening and shaping.

Then, referring to FIG. 6, a schematic view of the PU composite of the present invention is shown. The PU composite 3 includes a plastic layer 21, a second laminated layer 22, a wet PU foam layer 23, a first laminated layer 24, and a fabric layer 25.

The material of the plastic layer 21 is thermoplastic, which is selected from the group consisting of PC, ABS, PU, acrylic, and mixtures thereof.

The second laminated layer 22 is located on the plastic layer 21. The second laminated layer 22 is a paste, and the material thereof can be pressure-sensitive adhesive, moisture-curable resin, one-component resin, or two-component resin, and so on.

The wet PU foam layer 23 is located on the second laminated layer 22. The first laminated layer 24 is located on the wet PU foam layer 23. The first laminated layer 24 is a paste, and the material thereof can be pressure-sensitive adhesive, moisture-curable resin, one-component resin, or two-component resin, and so on.

The fabric layer 25 is located on the first laminated layer 24 and comprises PU resin, abrasion resistant, and colorant. The fabric layer 25 has a surface 251, and preferably, the surface 251 has a texture. The fabric layer 25 preferably comprises at least 25-99.80 wt % of PU resin, 0.1-25 wt % of abrasion resistant, and 0.1-50 wt % of colorant. The abrasion resistant preferably comprises silicone to improve the abrasion resistance of the PU composite 3. The colorant can improve the UV resistance and the solvent resistance of the PU composite 3, and preferably, the particle size of the colorant is less than 10 μm, preferably less than 5 μm.

The thickness of the plastic layer 21 is preferably 0.10-0.20 mm, the thickness of the second laminated layer 22 is 0.01-0.15 mm, the thickness of the wet PU foam layer 23 is 0.20-0.45 mm, the thickness of the first laminated layer 24 is 0.01-0.15 mm, and the thickness of the fabric layer 25 is 0.01-0.05 mm. The total thickness of the PU composite 3 is 0.38-0.90 mm.

The present invention will be further illustrated with reference to the following embodiments, but the present invention is not limited to the disclosure of the embodiments.

Embodiment 1

Firstly, a release paper is provided which has a texture on a surface. Next, a fabric layer is coated on the surface having the texture of the release paper. The fabric layer comprises: 20 wt % of PU resin, 0.5 wt % of abrasion resistant (the abrasion resistant comprises silicone), 0.5 wt % of colorant (the particle size of the colorant is less than 10 μm), 64 wt % of MEK, 10 wt % of DMF, and 5 wt % of TOL.

Next, after being dried in an oven, a first laminated layer is coated on the fabric layer. The first laminated layer is of one-component resin. After being dried in an oven again, a wet PU foam layer is laminated on the first laminated layer, and then placed for ripening and shaping for about 24 hr.

Next, the release paper is released to form a semi-product. Then, the semi-product is subjected to a surface treatment.

Next, a plastic layer is provided. The material of the plastic layer is PC. A second laminated layer is coated on the plastic layer, and the material of the second laminated layer is the same as that of the first laminated layer. The second laminated layer is then dried in an oven.

Finally, the wet PU foam layer of the semi-product is laminated on the second laminated layer to form a PU composite. Then, the PU composite is placed for ripening and shaping for about 24 hr.

The PU composite prepared in this embodiment includes a plastic layer, a second laminated layer, a wet PU foam layer, a first laminated layer, and a fabric layer in sequence. The material of the plastic layer is PC. The material of the second laminated layer is one-component resin. The material of the wet PU foam layer is PU resin. The material of the first laminated layer is the same as that of the second laminated layer. The fabric layer comprises 95.2 wt % of PU resin, 2.4 wt % of abrasion resistant, and 2.4 wt % of colorant. Because MEK, DMF and TOL in the fabric layer are volatilized during drying, only the PU resin, the abrasion resistant, and the colorant are left in the fabric layer of the resultant PU composite, and the weight percentages are changed as well.

The test results of the PU composite prepared in this embodiment are as follows: 1. the solvent resistance test (tested according to AATCC GREY method) is at Grade 5; 2. the surface abrasion test (tested according to ASTM D3884 CS-10 1 Kg method) is up to 4000 times; 3. the UV resistance test (tested according to ASTM G53 method, using these conditions: UVA wavelength of 340 nm, at 60×4 hr→50×4 hr→repeat for 96 hr) is at Grade 5.

Embodiment 2

The fabrication method of this embodiment is the same as that of Embodiment 1, except for the formulation of the fabric layer. The fabric layer of this example comprises: 20 wt % of PU resin, 0.5 wt % of abrasion resistant (the abrasion resistant comprises silicone), 0.5 wt % of colorant (a common colorant, having a particle size greater than 10 (m), 64 wt % of MEK, 10 wt % of DMF, and 5 wt % of TOL.

In the PU composite prepared in this embodiment, the fabric layer comprises 95.2 wt % of PU resin, 2.4 wt % of abrasion resistant, and 2.4 wt % of colorant.

The test methods of this embodiment are the same as those of Example 1, and the test results are as follows: 1. the solvent resistance test is at Grade 2; 2. the surface abrasion test is up to 4000 times; 3. the UV resistance test is at Grade 2.

Embodiment 3

The fabrication method of this embodiment is the same as that of Embodiment 1, except for the formulation of the fabric layer. The fabric layer of this embodiment comprises: 20 wt % of PU resin, 0.5 wt % of abrasion resistant (the particle size of the abrasion resistant is less than 10 μm), 64.5 wt % of MEK, 10 wt % of DMF, and 5 wt % of TOL.

In the PU composite prepared in this embodiment, the fabric layer comprises 97.6 wt % of PU resin and 2.4 wt % of colorant.

The test methods of this embodiment are the same as those of Embodiment 1, and the test results are as follows: 1. the solvent resistance test is at Grade 5; 2. the surface abrasion test is 300 times; 3. the UV resistance test is at Grade 5.

The test results of the above three embodiments are shown in the following table.

|  | Embodiment 1 | Embodiment 2 | Embodiment 3 |
|---|---|---|---|
| Solvent resistance test (tested according to AATCC GREY method) | Grade 5 | Grade 2 | Grade 5 |
| Surface abrasion test (tested according to ASTM D3884 CS-10 1 Kg method) | Up to 4000 times | Up to 4000 times | 300 times |
| UV resistance test (tested according to ASTM G53 method, using these conditions: UVA wavelength of 340 nm, at 60 C. ° × 4 hr → 50 C. ° × 4 hr → repeat for 96 hr) | Grade 5 | Grade 2 | Grade 5 |

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A method of fabricating a PU composite, comprising:
   (a) providing a release paper;
   (b) coating a fabric layer on the release paper, the fabric layer comprising PU resin, abrasion resistant, and colorant;
   (c) drying the fabric layer;
   (d) coating a first laminated layer on the fabric layer;
   (e) drying the first laminated layer;
   (f) laminating a wet PU foam layer on the first laminated layer;
   (g) releasing the release paper, so as to form a semi-product;
   (h) providing a plastic layer, wherein the material of the plastic layer is thermoplastic;
   (i) coating a second laminated layer on the plastic layer;
   (j) drying the second laminated layer; and
   (k) laminating the semi-product in Step (g) on the second laminated layer, so as to form a PU composite.

2. The method as claimed in claim 1, wherein in Step (a), a surface of the release paper has a texture.

3. The method as claimed in claim 1, wherein in Step (b), the fabric layer comprises 5-50 wt % of PU resin, 0.05-5 wt % of abrasion resistant, and 0.05-15 wt % of colorant.

4. The method as claimed in claim 1, wherein in Step (b), the abrasion resistant comprises silicone.

5. The method as claimed in claim 1, wherein in Step (b), the particle size of the colorant is less than 10 μm.

6. The method as claimed in claim 1, further comprising a step of surface treatment after Step (g).

7. The method as claimed in claim 1, wherein in Step (h), the material of the plastic layer is selected from the group consisting of polycarbonate (PC), acrylonitrile-butadiene-styrene copolymer (ABS), polyurethane (PU), acrylic, and mixtures thereof.

* * * * *